United States Patent
Dawson et al.

(10) Patent No.: US 11,301,230 B2
(45) Date of Patent: Apr. 12, 2022

(54) MACHINE LEARNING MULTIMEDIA CONVERSION ASSIGNMENT

(71) Applicant: KYNDRYL, INC., New York, NY (US)

(72) Inventors: Christopher J. Dawson, Arlington, VA (US); Christopher L. Molloy, Raleigh, NC (US); Craig M. Trim, Sylmar, CA (US); John M. Ganci, Jr., Cary, NC (US)

(73) Assignee: Kyndryl, Inc., New York, NY (US)

( * ) Notice: Subject to any disclaimer, the term of this patent is extended or adjusted under 35 U.S.C. 154(b) by 890 days.

(21) Appl. No.: 15/952,320

(22) Filed: Apr. 13, 2018

(65) Prior Publication Data
US 2019/0317748 A1 Oct. 17, 2019

(51) Int. Cl.
*G06F 8/65* (2018.01)
*G06F 8/33* (2018.01)
*G06N 20/00* (2019.01)

(52) U.S. Cl.
CPC ............. *G06F 8/65* (2013.01); *G06F 8/33* (2013.01); *G06N 20/00* (2019.01)

(58) Field of Classification Search
USPC ....................................................... 706/12
See application file for complete search history.

(56) References Cited

U.S. PATENT DOCUMENTS

| 6,687,671 | B2 | 2/2004 | Gudorf et al. |
| 8,095,595 | B2 | 1/2012 | Bobbitt et al. |
| 8,670,018 | B2 | 3/2014 | Cunnington et al. |
| 8,887,068 | B2 | 11/2014 | Roberts et al. |
| 9,338,199 | B2 | 5/2016 | Paulik et al. |
| 9,652,113 | B1 * | 5/2017 | Colson .................. G10L 15/26 |
| 9,846,526 | B2 | 12/2017 | Lemus et al. |

(Continued)

FOREIGN PATENT DOCUMENTS

WO 2006089355 8/2006

OTHER PUBLICATIONS

Aurik, Martijn; 5 Meeting Minutes Tools That Will Help You Get Results; https://www.getminute.com/meeting-minutes-tools; Sep. 19, 2016; 7 pages.

(Continued)

*Primary Examiner* — Sherief Badawi
*Assistant Examiner* — Conrad R Pack
(74) *Attorney, Agent, or Firm* — Schmeiser, Olsen & Watts; Erik Swanson

(57) ABSTRACT

A method and system for improving a machine learning multimedia conversion process is provided. The method includes automatically connecting hardware devices to a server hardware device. Audio and/or video data from a meeting between individuals is recorded form a location and each individual is identified via sensor data. Attributes for each user are identified and the audio and/or video data is converted to text data. Portions of the text data are analyzed and associated with each individual. Action items in the text data are identified and assigned to the individuals based on the attributes. Self-learning software code for executing future multimedia conversion processes is generated based on the assigning and the self-learning software code is modified based on results of executing the future multimedia conversion processes.

17 Claims, 6 Drawing Sheets

(56) References Cited

U.S. PATENT DOCUMENTS

| | | | |
|---|---|---|---|
| 2004/0177260 A1* | 9/2004 | Gilfix | G06F 21/52 713/193 |
| 2006/0047615 A1* | 3/2006 | Ravin | G06N 5/022 706/50 |
| 2006/0047816 A1 | 3/2006 | Lawton et al. | |
| 2009/0017746 A1 | 1/2009 | Clemenz et al. | |
| 2015/0288688 A1* | 10/2015 | Derakhshani | G06F 21/629 726/19 |
| 2016/0042735 A1* | 2/2016 | Vibbert | G10L 15/222 704/257 |
| 2016/0189713 A1 | 6/2016 | Liu | |
| 2017/0039105 A1* | 2/2017 | Shivanna | G06Q 10/20 |
| 2017/0124336 A1* | 5/2017 | Freudiger | G06F 40/242 |
| 2017/0310716 A1* | 10/2017 | Lopez Venegas | G06Q 10/1093 |
| 2017/0359393 A1 | 12/2017 | Rajagopal et al. | |
| 2018/0239822 A1* | 8/2018 | Reshef | G06F 40/242 |
| 2018/0268200 A1* | 9/2018 | Bandameedipalli | G06Q 10/105 |
| 2018/0348023 A1* | 12/2018 | Klein | G01D 18/00 |

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

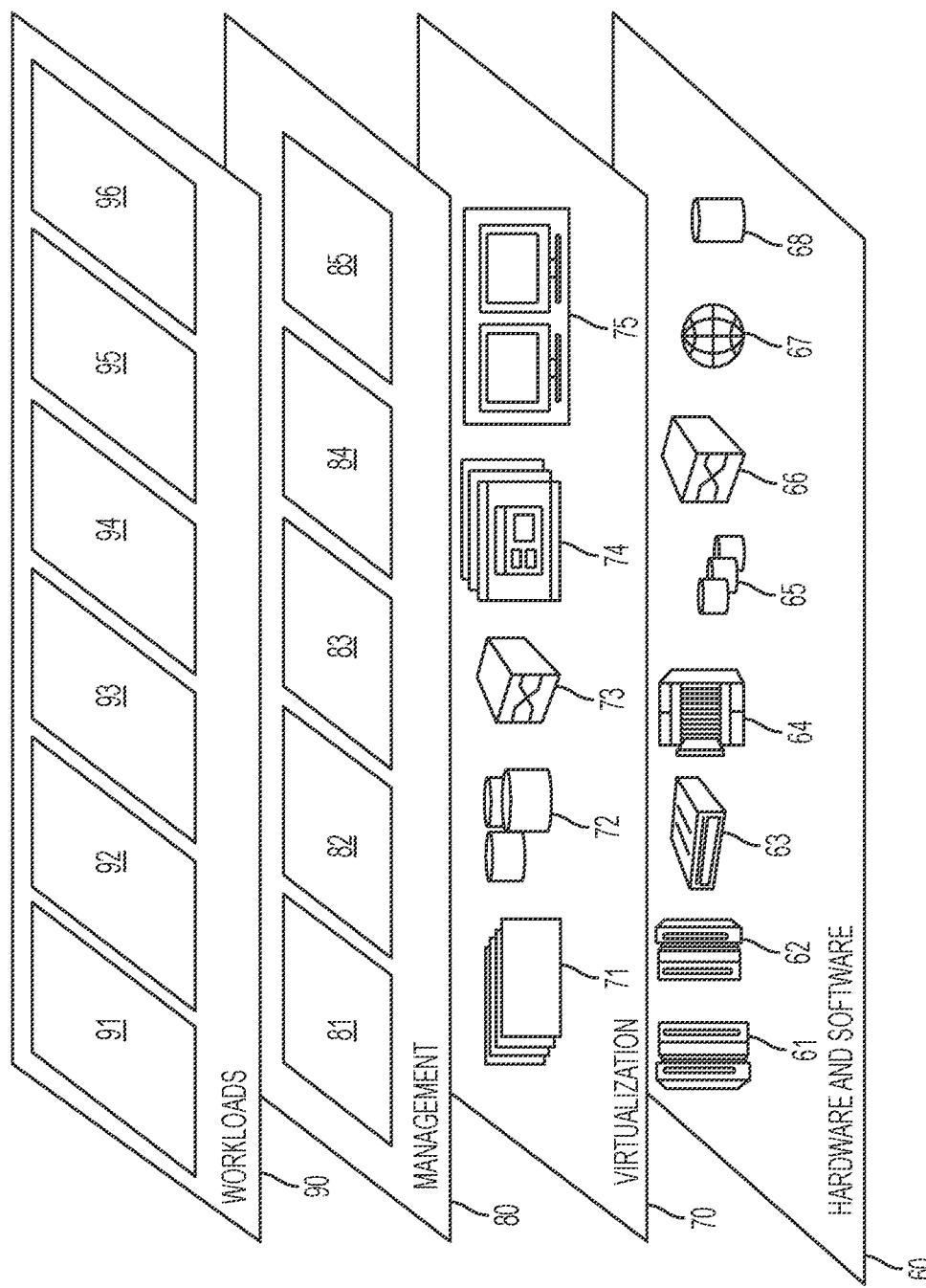

MACHINE LEARNING MULTIMEDIA CONVERSION ASSIGNMENT

FIELD

The present invention relates generally to a method for converting between multimedia formats in particular to a method and associated system for improving self-learning software technology associated with enabling sensors for identifying individuals and using converted multimedia for assigning action items between the individuals.

BACKGROUND

Accurately assigning tasks typically includes an inaccurate process with little flexibility. Controlling and modifying software associated with task assignment may include a complicated process that may be time consuming and require a large amount of resources. Accordingly, there exists a need in the art to overcome at least some of the deficiencies and limitations described herein above.

SUMMARY

A first aspect of the invention provides a machine learning multimedia conversion improvement method comprising: automatically connecting, by a processor of a server hardware device, hardware devices to said server hardware device; recording, by said processor from an audio or video conference at a geographical location, audio and/or video data from a meeting between a plurality of individuals; identifying, by said processor via sensors or external sources, attributes of each said individual; converting, by said processor, said audio and/or video data to associated text data; associating, by said processor, portions of said text data with associated individuals of said plurality of individuals; analyzing, by said processor, said portions of said text data; identifying, by said processor based on results of said analyzing, action items identified in said text data; assigning, by said processor, said action items to said plurality of individuals based on identified attributes; generating, by said processor based on results of said assigning, self-learning software code for executing future multimedia conversion processes; and modifying, by said processor based on results of executing said future multimedia conversion processes, said self-learning software code.

A second aspect of the invention provides a computer program product, comprising a computer readable hardware storage device storing a computer readable program code, said computer readable program code comprising an algorithm that when executed by a processor of a server hardware device implements a machine learning multimedia conversion improvement method, said method comprising: automatically connecting, by said processor, hardware devices to said server hardware device; recording, by said processor from an audio or video conference at a geographical location, audio and/or video data from a meeting between a plurality of individuals; identifying, by said processor executing a plurality of automated sensors, each individual of plurality of individuals; identifying, by said processor via sensors or external sources, attributes of each said individual; converting, by said processor, said audio and/or video data to associated text data; associating, by said processor, portions of said text data with associated individuals of said plurality of individuals; analyzing, by said processor, said portions of said text data; identifying, by said processor based on results of said analyzing, action items identified in said text data; assigning, by said processor, said action items to said plurality of individuals based on identified attributes; generating, by said processor based on results of said assigning, self-learning software code for executing future multimedia conversion processes; and modifying, by said processor based on results of executing said future multimedia conversion processes, said self-learning software code.

A third aspect of the invention provides a server hardware device comprising a processor coupled to a computer-readable memory unit, said memory unit comprising instructions that when executed by the computer processor implements a machine learning multimedia conversion improvement method comprising: automatically connecting, by said processor, hardware devices to said server hardware device; recording, by said processor from an audio or video conference at a geographical location, audio and/or video data from a meeting between a plurality of individuals; identifying, by said processor executing a plurality of automated sensors, each individual of plurality of individuals; identifying, by said processor via sensors or external sources, attributes of each said individual; converting, by said processor, said audio and/or video data to associated text data; associating, by said processor, portions of said text data with associated individuals of said plurality of individuals; analyzing, by said processor, said portions of said text data; identifying, by said processor based on results of said analyzing, action items identified in said text data; assigning, by said processor, said action items to said plurality of individuals based on identified attributes; generating, by said processor based on results of said assigning, self-learning software code for executing future multimedia conversion processes; and modifying, by said processor based on results of executing said future multimedia conversion processes, said self-learning software code.

The present invention advantageously provides a simple method and associated system capable of accurately assigning tasks.

BRIEF DESCRIPTION OF THE DRAWINGS

FIG. 6 illustrates a set of functional abstraction layers provided by cloud computing environment, in accordance with embodiments of the present invention.

DETAILED DESCRIPTION

Figure 1:
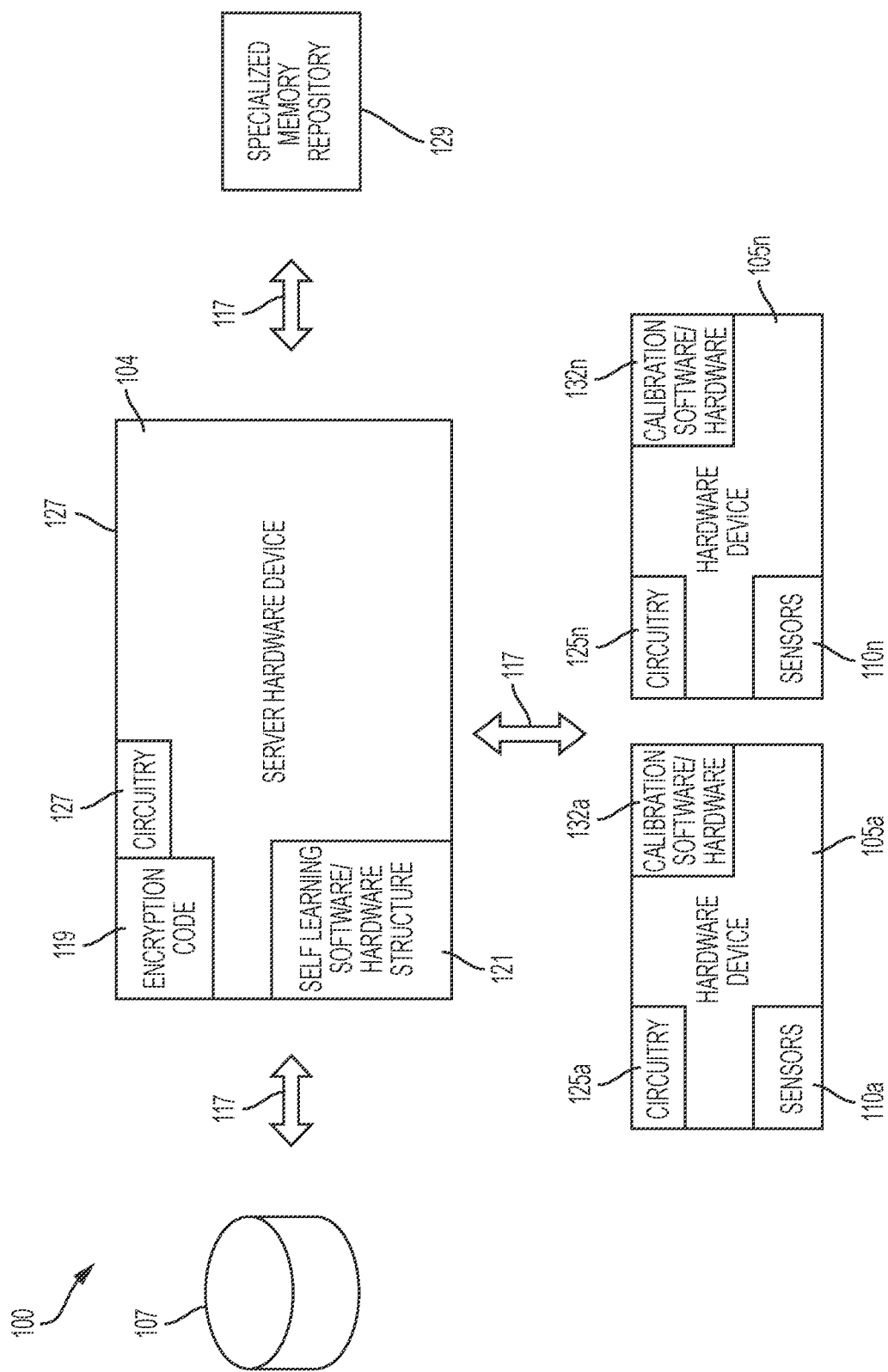
FIG. 1 illustrates a system for improving self-learning software technology associated with enabling sensors for identifying individuals and using converted multimedia for assigning action items between the individuals, in accordance with embodiments of the present invention.

FIG. 1 illustrates a system 100 for improving self-learning software technology associated with enabling sensors for identifying individuals and using converted multimedia for assigning action items between the individuals, in accordance with embodiments of the present invention. System 100 enables a machine learning software/hardware system for processing audio and/or video data from an audible meeting by recording audio from a meeting between multiple individuals. The individuals (in the meeting) and associated attributes (e.g., role, experience, rank, skills, etc.) are identified via automated sensors (e.g., video sensors, biometric sensors, audible sensors, etc.) and/or via external sources. For example, the associated attributes may be identified via social media sources from users providing endorsement based recommendations. The audio and/or video data is converted to text data and portions of the text data are assigned to specified individuals. Additionally, action items of the text are identified and assigned to the individuals based on the attributes.

System 100 of FIG. 1 includes a server hardware device 104 (i.e., specialized hardware device), hardware devices 105a ... 105n (i.e., specialized hardware device), a specialized memory repository, and a database 107 (e.g., a cloud based system) interconnected through a network 117. Server database system 104 includes specialized circuitry 127 (that may include specialized software), encryption code 119 (for encrypting any output), and self-software code/hardware structure 121 (i.e., including self-learning software code). Hardware devices 105a ... 105n may include personal devices provided to each individual. Hardware devices 105a ... 105n may be Bluetooth enabled to provide connectivity to technical support systems. Hardware devices 105a ... 105n include specialized circuitry 125a ... 125n (that may include specialized software), calibration software/hardware 132a ... 132n, and sensors 110a ... 110n. Sensors 110a ... 110n may include any type of internal or external sensor (or biometric sensor) including, inter alia, a heart rate monitor, a blood pressure monitor, a temperature sensor, a pulse rate monitor, an ultrasonic sensor, an optical sensor, a video retrieval device, an audio retrieval device, humidity sensors, etc. Calibration software/hardware 132a ... 132n may include specialized testing circuitry/logic. Server hardware device 104, hardware devices 105a ... 105n, and database 107a may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, hardware devices 105 ... 105n, and database 107 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving self-learning software technology associated with enabling sensors for identifying individuals and using converted multimedia for assigning action items between the individuals. Network 117 may include any type of network including, inter alia, a local area network, (LAN), a wide area network (WAN), the Internet, a wireless network, etc. Alternatively, network 117 may include an application programming interface (API).

System 100 comprises a machine learning system for generating self-learning software code for enabling a process for automatically determining an identity of individuals (and associated roles, experience, rank and skills) in a meeting. The identities and associated information are used to generate software code for generating a weighting for each individual. For example, a user (Chris) may be an expert in data mining technology and associated software code may verify that Chris is an expert in data mining technology by analyzing prior publications, patents, and feedback from colleagues regarding the aforementioned verification. The verification process may be used to execute a weighting algorithm with respect to audible information (obtained during the meeting) retrieved from Chris.

Current technology utilizes a minute taker individual for retrieving meeting notes. Alternatively, individuals are encouraged to come to an agreement with respect to action items and topics. Consequently, meeting topics may be lost or forgotten during meeting minute generation. System 100 improves current meeting recordation technology by generating self-learning software code for automatically determining action items and associated functionality. The action items are determined based on linguistic analysis execution (via specialized software code executed by specialized hardware including specialized circuitry) using transcripts associated with audio automatically converted into text. Likewise, converted sentences, snippets, and paragraphs are automatically assigned to each individual. Additionally, a tone of voices and associated sentiment are analyzed and presented (via a specialized graphical user interface) in combination with textual output. Location of imperative forms and verb-noun phrasing enables system 100 to locate action items (e.g., decisions made). Additionally, action items are classified by similarity. The action items may be compared to an existing knowledge database comprising common actions resulting in execution of a validation process. Furthermore, action items may be structured via a hierarchy. For example, if a meeting participant suggests that an email should be transmitted to a client, this may be determined to be an action item. Likewise, if another meeting participant specifies that an estimate must be prepared, then an entire knowledge database is searched and analyzed such that a resulting parse tree output may use associated linguistic markers to determine actions preceding each other. Furthermore, if another participant states that: "after we transmit a communication, we must finalize a project plan", system 100 will digitally analyze all synonymous relationships to determine that transmitting a communication is conceptually similar to transmitting an email thereby hieratically structuring action items accordingly. Additionally, when an individual utilizes specific pronouns (e.g., you must, you need to, Jill should send, etc.), then action assignment code is executed. Likewise, when a general pronoun such as "we need to" or "we should" is used, system 100 may leverage its knowledge (via database processing) of individual participants via analysis of member schedules for free cycles and skill levels. If a communication must be transmitted to a client, system 100 may analyze participants to determine which role and associated knowledge level is most appropriate to perform the action (e.g., a project executive vs. a tester). In each of the aforementioned examples, a specific type of action item or skill level of a participant will enable determination of an individual for action item assignment. System 100 is enabled to assign a most likely candidate for reception of action items and additional likely candidates may be assigned as backups for reception of action items. When an action item is not associated with a unanimous agreement, system is enabled for executed action assignment code and the aforementioned disagreement is recorded for documentation. The self-learning software code generated by system 100 is configurable such that a team of individuals may select action item assignment with a strikethrough thereby enabling a task to appear in a non-started state for documentation purposes. System 100 automatically captures all reasoning and associated individuals behind each decision.

Figure 2:
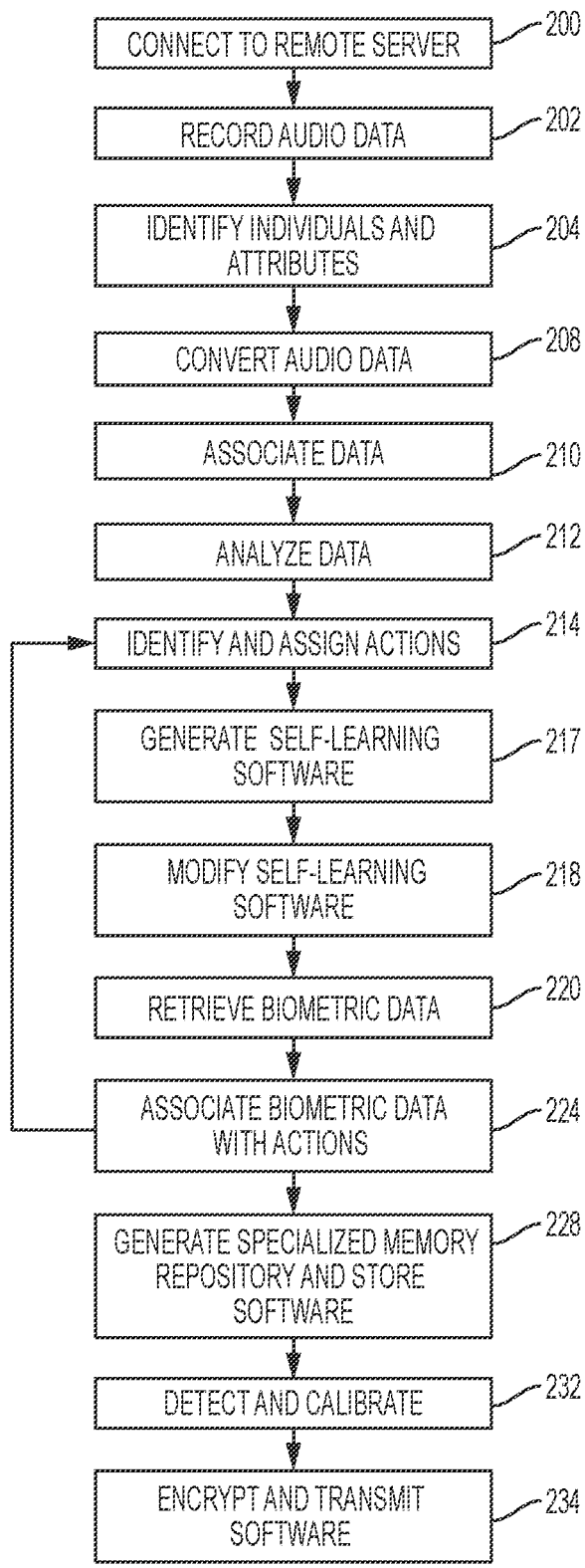
FIG. 2 illustrates an algorithm detailing a process flow enabled by the system of FIG. 1 for improving self-learning software technology associated with enabling sensors for identifying individuals and using converted multimedia for assigning action items between the individuals, in accordance with embodiments of the present invention.

FIG. 2 illustrates an algorithm detailing a process flow enabled by system 100 of FIG. 1 for improving self-learning software technology associated with enabling sensors for identifying individuals and using converted multimedia for assigning action items between the individuals, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and hardware devices 105*a* . . . 105*n*. In step 200, hardware devices (e.g., hardware devices 105*a* . . . 105*n* of FIG. 1) are automatically connected to a remote server hardware device (e.g., server hardware device 105 of FIG. 1). In step 202, audio and/or video data from a meeting between individuals is recording from a geographical location associated with the meeting. For example, a geographic location may be associated with a teleconference or video conference such that individuals do not have to be co-located. Likewise, video analysis code may be executed to determine an action item volunteer(s) or voting preference. In step 204, each individual is identified via execution of automated sensors with respect to the server hardware device and the hardware devices. Additionally, attributes (e.g., work item role attributes, work item experience attributes, work item rank attributes, work item skill attributes, etc.) for each individual are identified. The automated sensors may include video retrieval sensors such that identifying each individual includes: retrieving a visual image for each individual and executing facial recognition software with respect to each individual. Alternatively, the automated sensors may include biometric sensors such that identifying each individual includes: retrieving biometric data for each individual and executing biometric recognition software with respect to each individual. Additionally, the automated sensors may include audio sensors such that identifying each individual includes: retrieving audio based data from each individual and executing audio recognition software with respect to each individual. Alternatively, the attributes (e.g., work item role attributes, work item experience attributes, work item rank attributes, work item skill attributes, etc.) for each individual may identified via external sources that may include, inter alia, social media sources, an organizational chart (for determining management and employee), etc.

In step 208, the audio and/or video data is converted into associated text data. In step 210, portions of the text data are associated with each individual. In step 212, the portions of text data are analyzed. In step 214, the action items are identified in the text based on results of step 212. The action items are assigned to the individuals based on identified attributes. The action items may include, inter alia, actions agreed upon between the individuals, actions not agreed upon between the individuals, work item actions implemented by the individuals, work item actions initiated by the individuals, etc. Work item actions may include, inter alia, automated machine software actions including automated software configuration actions, automated software repair actions, automated software update actions, automated software modification actions, etc. Alternatively, work item actions may include, inter alia, automated machine hardware actions including, automated hardware configuration actions, automated hardware repair actions, automated hardware update actions, automated hardware modification actions, automated firmware update actions, etc.

In step 217, self-learning software code for executing future multimedia conversion processes is generated based on results of step 214. In step 218, the self-learning software code is modified based on said results of future multimedia conversion processes being executed. In step 220, biometric data is retrieved (via biometric sensors) for the individuals. In step 224, the biometric data is associated with the action items and the action items may be further assigned (in step 214) based on the association. In step 228, a specialized memory repository is generated within a specified portion of a hardware memory device of the hardware server device. The self-learning software code is stored within the specialized memory repository. In step 232, a calibration error of at least one of the automated sensors is automatically detected. In response, the automated sensor(s) is automatically calibrated. The automated calibration process may include calibrating software and/or hardware of the automated sensor(s). In step 234, the self-learning software code is encrypted and transmitted to the hardware devices.

Figure 3:
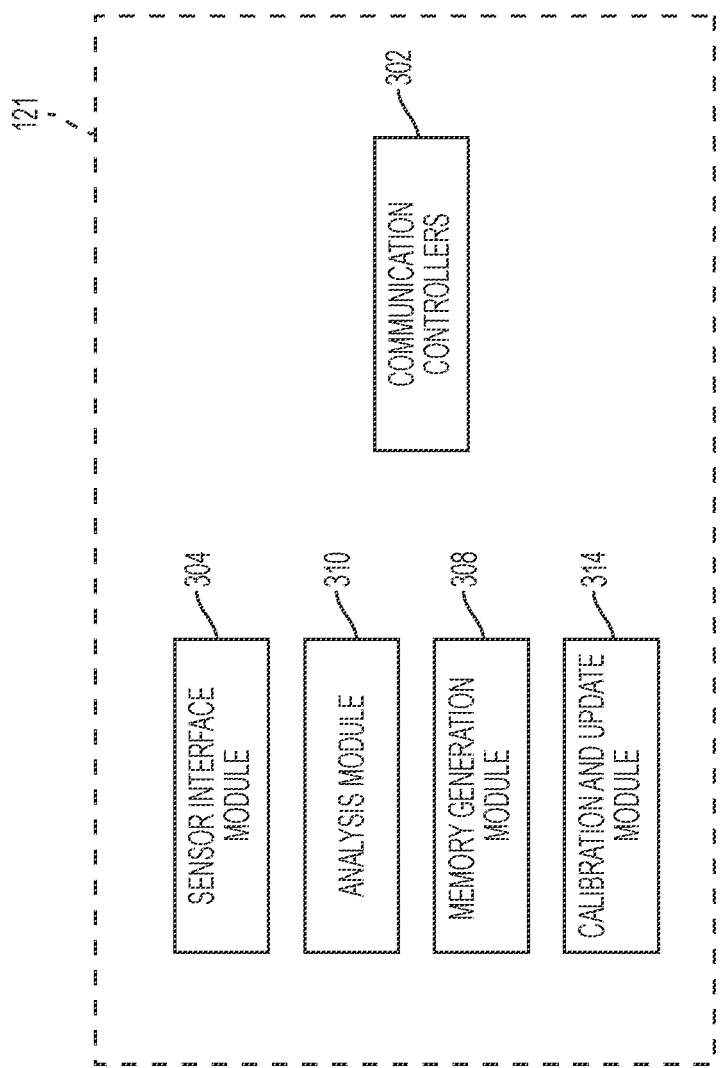
FIG. 3 illustrates an internal structural view of the self-learning software code/hardware structure of FIG. 1, in accordance with embodiments of the present invention.

FIG. 3 illustrates an internal structural view of self-learning software code/hardware structure 121 of FIG. 1, in accordance with embodiments of the present invention. Self-learning software code/hardware structure 121 includes a sensor interface module 304, an analysis module 310, a memory generation module 308, a calibration and update module 314, and communication controllers 302. Sensor interface module 304 comprises specialized hardware and software for controlling all functions related to sensors 110*a* . . . 110*n* of FIG. 1. Analysis module 310 comprises specialized hardware and software for controlling all functionality related to execution of step 212 of FIG. 2. Memory generation module 308 comprises specialized hardware and software for controlling all functionality related to generation and modification of any specialized memory structure. Calibration and update module 314 comprises specialized hardware and software for calibrating and updating all hardware (e.g., firmware, sensors, circuitry, etc.) and software of system 100 of FIG. 1. Communication controllers 302 are enabled for controlling all communications between sensor interface module 304, analysis module 310, memory generation module 308, and calibration and update module 314.

Figure 4:
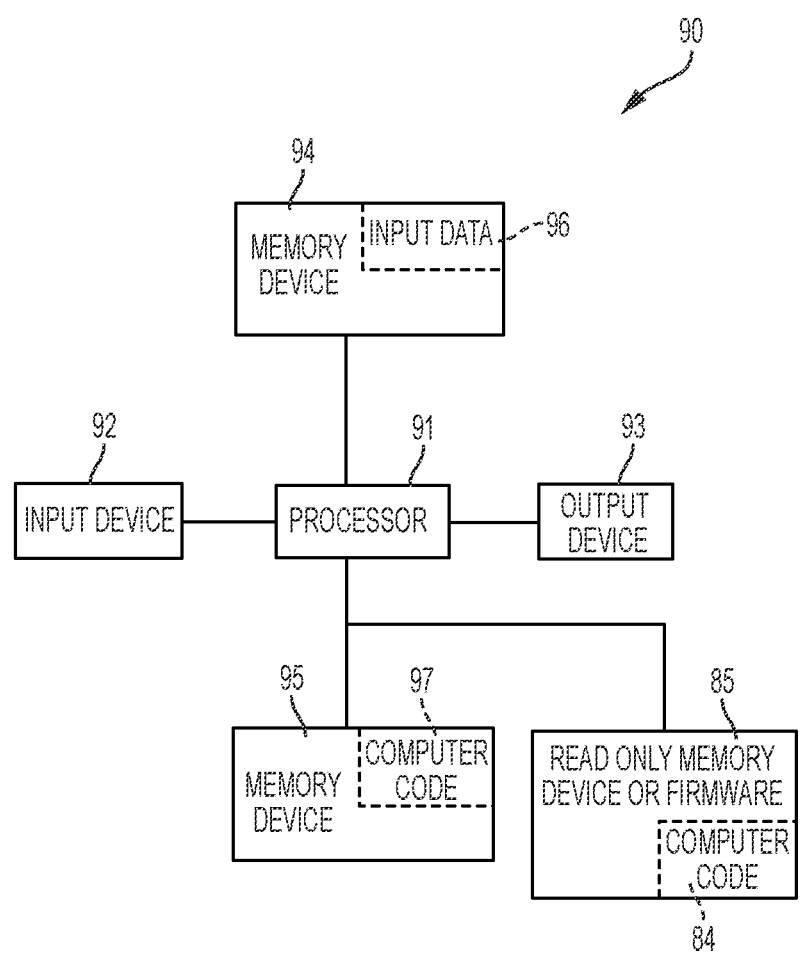
FIG. 4 illustrates a computer system used by the system of FIG. 1 for improving self-learning software technology associated with enabling sensors for identifying individuals and using converted multimedia for assigning action items between the individuals, in accordance with embodiments of the present invention.

FIG. 4 illustrates a computer system 90 (e.g., hardware devices 105*a* . . . 105*n* and/or server hardware device 104 of FIG. 1) used by or comprised by the system of FIG. 1 for improving self-learning software technology associated with enabling sensors for identifying individuals and using converted multimedia for assigning action items between the individuals, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving self-learning software technology associated with enabling sensors for identifying individuals and using converted multimedia for assigning action items between the individuals. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve self-learning software technology associated with enabling sensors for identifying individuals and use converted multimedia for assigning action items between the individuals Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving self-learning software technology associated with enabling sensors for identifying individuals and using converted multimedia for assigning action items between the individuals. In another embodiment, the invention provides a business method that performs the process steps of the invention on a subscription, advertising, and/or fee basis. That is, a service supplier, such as a Solution Integrator, could offer to enable a process for improving self-learning software technology associated with enabling sensors for identifying individuals and using converted multimedia for assigning action items between the individuals. In this case, the service supplier can create, maintain, support, etc. a computer infrastructure that performs the process steps of the invention for one or more customers. In return, the service supplier can receive payment from the customer(s) under a subscription and/or fee agreement and/ or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
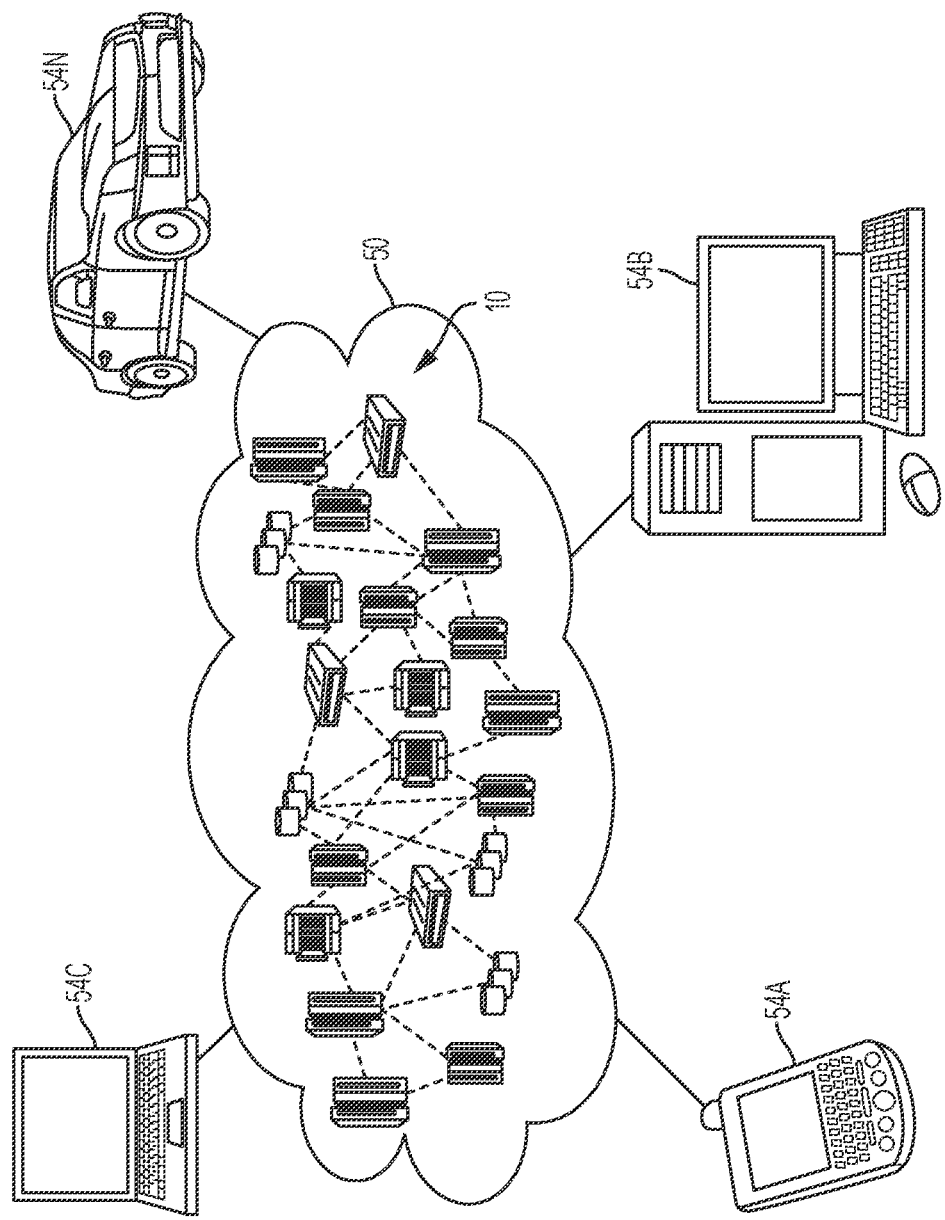
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving self-learning software technology associated with enabling sensors for identifying individuals and using converted multimedia for assigning action items between the individuals 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A machine learning multimedia conversion improvement method comprising:
   automatically connecting, by a processor of a server hardware device, hardware devices to said server hardware device;
   recording, by said processor from an audio or video conference at a geographical location, audio and/or video data from a meeting between a plurality of individuals;

retrieving by said processor via a plurality of biometric sensors, biometric data from said plurality of individuals, wherein said plurality of biometric sensors comprise sensors selected from the group consisting of a heart rate monitor, a blood pressure monitor, a temperature sensor, a pulse rate monitor, an ultrasonic sensor, an optical sensor, and a humidity sensor;

identifying, by said processor executing a plurality of automated sensors, wherein the plurality of automated sensors comprises video retrieval sensors or audio sensors and comprises said plurality of biometric sensors, and based on said biometric data, each individual of said plurality of individuals, wherein said identifying each said individual comprises executing facial recognition software or audio recognition software with respect to each individual and comprises executing biometric recognition software with respect to said biometric data and each said individual;

identifying, by said processor via sensors or external sources, attributes of each said individual;

verifying, by said processor based on results of analyzing prior publications, patents, and feedback from colleagues, each said individual to determine expertise with respect to various technologies;

generating, by said processor, software code for generating a weighting factor for each said individual;

executing, by said processor, an associated weighting algorithm with respect to audible information obtained during said audio or video conference;

converting, by said processor, said audio and/or video data to associated text data;

associating, by said processor, portions of said text data with associated individuals of said plurality of individuals;

automatically assigning, by said processor, converted sentences, snippets, and paragraphs, of said portions of said text data, to each said individual;

analyzing, by said processor, said portions of said text data;

analyzing, by said processor, a tone of voices and associated sentiment of said associated individuals;

presenting, by said processor via a specialized graphical user interface, said tone of voices and associated sentiment in combination with textual output;

identifying, by said processor based on results of said analyzing of said portions of said text data and using transcripts, action items in said text data;

structuring, by said processor, said action items via a hierarchy by searching and analyzing a knowledge database and generating a resulting parse tree output using associated linguistic markers to determine said action items preceding each other;

associating, by said processor, said biometric data with said action items;

assigning, by said processor based on results of said associating said biometric data with said action items, said action items to said plurality of individuals based on identified attributes with respect to said biometric data;

generating, by said processor based on results of said assigning, self-learning software code for executing future multimedia conversion processes;

modifying, by said processor based on results of executing said future multimedia conversion processes, said self-learning software code;

encrypting, by said processor, said self-learning software code resulting in an encrypted self-learning software application; and transmitting, by said processor, said encrypted self-learning software application to said hardware devices.

2. The method of claim 1, wherein said action items comprise actions agreed upon between said plurality of individuals and associated decisions determined via audio and video interactions.

3. The method of claim 1, wherein said action items comprise actions not agreed upon between said plurality of individuals.

4. The method of claim 1, wherein said action items comprise work item actions implemented by said plurality of individuals.

5. The method of claim 1, wherein said action items comprise work item actions initiated by said plurality of individuals.

6. The method of claim 5, wherein said work item actions comprise automated machine software actions selected from the group consisting of automated software configuration actions, automated software repair actions, automated software update actions, and automated software modification actions.

7. The method of claim 5, wherein said work item actions comprise automated machine hardware actions selected from the group consisting of automated hardware configuration actions, automated hardware repair actions, automated hardware update actions, automated hardware modification actions, and automated firmware update actions.

8. The method of claim 1, wherein said plurality of automated sensors comprise said video retrieval sensors, and wherein said identifying each said individual comprises:
retrieving a visual image for each said individual; and
executing facial recognition software with respect to each said individual.

9. The method of claim 1, wherein said plurality of automated sensors comprise said audio sensors, and wherein said identifying each said individual comprises:
retrieving audio based data from each said individual; and
executing audio recognition software with respect to each said individual.

10. The method of claim 1, wherein said attributes are selected from the group consisting of work item role attributes, work item experience attributes, work item rank attributes, and work item skill attributes.

11. The method of claim 1, further comprising:
generating, by said processor, a specialized memory repository within a specified portion of a hardware memory device of said server hardware device; and
storing, by said processor within said specialized memory repository, said self-learning software code.

12. The method of claim 1, further comprising:
automatically detecting, by said processor, a calibration error of at least one sensor of said automated sensors; and
automatically calibrating, by said processor, said at least one sensor.

13. The method of claim 12, wherein said automatically calibrating comprises calibrating software of said at least one sensor.

14. The method of claim 12, wherein said automatically calibrating comprises calibrating hardware of said at least one sensor.

15. The method of claim 1, further comprising:
providing at least one support service for at least one of creating, integrating, hosting, maintaining, and deploying computer-readable code in the server hardware device, said code being executed by the computer processor to implement: said automatically connecting, said recording, said identifying each said individual, said identifying said attributes of each said individual, said converting, said associating, said analyzing, said identifying said action items identified in said text; said assigning, said generating, and said modifying.

16. A computer program product, comprising a computer readable hardware storage device storing a computer readable program code, said computer readable program code comprising an algorithm that when executed by a processor of a server hardware device implements a machine learning multimedia conversion improvement method, said method comprising:

automatically connecting, by said processor, hardware devices to said server hardware device;

recording, by said processor from an audio or video conference at a geographical location, audio and/or video data from a meeting between a plurality of individuals;

retrieving by said processor via a plurality of biometric sensors, biometric data from said plurality of individuals, wherein said plurality of biometric sensors comprise sensors selected from the group consisting of a heart rate monitor, a blood pressure monitor, a temperature sensor, a pulse rate monitor, an ultrasonic sensor, an optical sensor, and a humidity sensor;

identifying, by said processor executing a plurality of automated sensors, wherein the plurality of automated sensors comprises video retrieval sensors or audio sensors and comprises said plurality of biometric sensors, and based on said biometric data, each individual of said plurality of individuals, wherein said identifying each said individual comprises executing facial recognition software or audio recognition software with respect to each individual and comprises executing biometric recognition software with respect to said biometric data and each said individual;

identifying, by said processor via sensors or external sources, attributes of each said individual;

verifying, by said processor based on results of analyzing prior publications, patents, and feedback from colleagues, each said individual to determine expertise with respect to various technologies;

generating, by said processor, software code for generating a weighting factor for each said individual;

executing, by said processor, an associated weighting algorithm with respect to audible information obtained during said audio or video conference;

converting, by said processor, said audio and/or video data to associated text data;

associating, by said processor, portions of said text data with associated individuals of said plurality of individuals;

automatically assigning, by said processor, converted sentences, snippets, and paragraphs, of said portions of said text data, to each said individual;

analyzing, by said processor, said portions of said text data;

analyzing, by said processor, a tone of voices and associated sentiment of said associated individuals;

presenting, by said processor via a specialized graphical user interface, said tone of voices and associated sentiment in combination with textual output;

identifying, by said processor based on results of said analyzing of said portions of said text data and using transcripts, action items in said text data;

structuring, by said processor, said action items via a hierarchy by searching and analyzing a knowledge database and generating a resulting parse tree output using associated linguistic markers to determine said action items preceding each other;

associating, by said processor, said biometric data with said action items;

assigning, by said processor based on results of said associating said biometric data with said action items, said action items to said plurality of individuals based on identified attributes with respect to said biometric data;

generating, by said processor based on results of said assigning, self-learning software code for executing future multimedia conversion processes;

modifying, by said processor based on results of executing said future multimedia conversion processes, said self-learning software code;

encrypting, by said processor, said self-learning software code resulting in an encrypted self-learning software application; and transmitting, by said processor, said encrypted self-learning software application to said hardware devices.

17. A server hardware device comprising a processor coupled to a computer-readable memory unit, said memory unit comprising instructions that when executed by the computer processor implements a machine learning multimedia conversion improvement method comprising:

automatically connecting, by said processor, hardware devices to said server hardware device;

recording, by said processor from an audio or video conference at a geographical location, audio and/or video data from a meeting between a plurality of individuals;

retrieving by said processor via a plurality of biometric sensors, biometric data from said plurality of individuals, wherein said plurality of biometric sensors comprise sensors selected from the group consisting of a heart rate monitor, a blood pressure monitor, a temperature sensor, a pulse rate monitor, an ultrasonic sensor, an optical sensor, and a humidity sensor;

identifying, by said processor executing a plurality of automated sensors, wherein the plurality of automated sensors comprises video retrieval sensors or audio sensors and comprises said plurality of biometric sensors, and based on said biometric data, each individual of said plurality of individuals, wherein said identifying each said individual comprises executing facial recognition software or audio recognition software with respect to each individual and comprises executing biometric recognition software with respect to said biometric data and each said individual;

identifying, by said processor via sensors or external sources, attributes of each said individual;

verifying, by said processor based on results of analyzing prior publications, patents, and feedback from colleagues, each said individual to determine expertise with respect to various technologies;

generating, by said processor, software code for generating a weighting factor for each said individual;

executing, by said processor, an associated weighting algorithm with respect to audible information obtained during said audio or video conference;

converting, by said processor, said audio and/or video data to associated text data;

associating, by said processor, portions of said text data with associated individuals of said plurality of individuals;

automatically assigning, by said processor, converted sentences, snippets, and paragraphs, of said portions of said text data, to each said individual;

analyzing, by said processor, said portions of said text data;

analyzing, by said processor, a tone of voices and associated sentiment of said associated individuals;

presenting, by said processor via a specialized graphical user interface, said tone of voices and associated sentiment in combination with textual output;

identifying, by said processor based on results of said analyzing of said portions of said text data and using transcripts, action items in said text data;

structuring, by said processor, said action items via a hierarchy by searching and analyzing a knowledge database and generating a resulting parse tree output using associated linguistic markers to determine said action items preceding each other;

associating, by said processor, said biometric data with said action items;

assigning, by said processor based on results of said associating said biometric data with said action items, said action items to said plurality of individuals based on identified attributes with respect to said biometric data;

generating, by said processor based on results of said assigning, self-learning software code for executing future multimedia conversion processes;

modifying, by said processor based on results of executing said future multimedia conversion processes, said self-learning software code;

encrypting, by said processor, said self-learning software code resulting in an encrypted self-learning software application; and transmitting, by said processor, said encrypted self-learning software application to said hardware devices.

\* \* \* \* \*